Nov. 13, 1951  D. C. HARVEY  2,575,012
RAPID FILM WIND DEVICE
Filed Dec. 30, 1947

DOUGLASS C. HARVEY
INVENTOR

BY
ATTORNEYS

Patented Nov. 13, 1951

2,575,012

UNITED STATES PATENT OFFICE 2,575,012

RAPID FILM WIND DEVICE

Douglass C. Harvey, Rochester, N. Y., assignor to Eastman Kodak Company, Rochester, N. Y., a corporation of New Jersey.

Application December 30, 1947, Serial No. 794,637

8 Claims. (Cl. 242—71)

The present invention relates to a winding mechanism and more particularly to one specifically adapted for use in cameras as a film wind.

In cameras using roll film it is of considerable advantage to be able to place successive portions of the film strip in position for exposure by automatic means which not only permits this operation to be rapidly performed but insures accuracy in positioning the film. As a result exposures may be rapidly made and the danger of overwinding entirely eliminated. Numerous camera mechanisms have been devised in the past by which the film may be accurately metered without the necessity of the photographer observing indicia on the film or film backing paper through a window in the back of the camera whereby he can ascertain that the film is correctly positioned for each exposure. Such mechanisms often include a sprocket, adapted to be rotated by the perforated edge of the film as it is wound between the supply and take-up spools, and an associated element which is rotated by the sprocket a predetermined amount until a locking device is caused to engage the winding mechanism to preclude further rotation thereof. Such a device is disclosed in U. S. Letters Patent 2,063,331, granted on December 8, 1936 to August Nagel. The locking element in that device comprises a pawl which engages a ratchet wheel. In the Nagel camera, however, the film is wound upon the take-up spool by means of a conventional knob on the spool-engaging spindle. The hand-manipulation of such a knob is a comparatively slow method of rotating the winding spindle and the present invention is directed to the provision of an improved winding mechanism which permits an easier and more rapid rotation of the film spool and which is adapted to be used with a film-metering device of the type employing a pawl stop, such as is disclosed in the above Nagel patent.

Although particularly adapted for use in a camera with a film-metering device such as described above, the present winding mechanism may be used independently of any film-metering device, wherever a more efficient and expeditious hand-winding mechanism other than that provided by the conventional hand knob is desired. For that matter the present invention will have application outside of the field of cameras, wherever an efficient hand-winding mechanism is desired.

It is, therefore, an object of this invention to provide an improved winding mechanism.

It is a further object of this invention to provide a more expeditious winding mechanism which is particularly adapted for use in roll film cameras.

It is a still further object of this invention to provide an improved film wind which is adapted to cooperate with a film-metering mechanism in a camera to permit the rapid and accurate positioning of portions of the film for successive exposures.

It is a still further object of this invention to provide a winding device of the character described which is simple in construction, relatively inexpensive, and efficient of operation.

Other objects and advantages of the invention will become apparent from the following description taken in connection with the accompanying drawing, and it will be understood that many changes may be made in the details of construction and arrangement of parts shown and described without departing from the spirit of the invention as expressed in the accompanying claims. I, therefore, do not wish to be limited to the exact details shown and described as the preferred form only has been shown by way of illustration.

Figure 3:
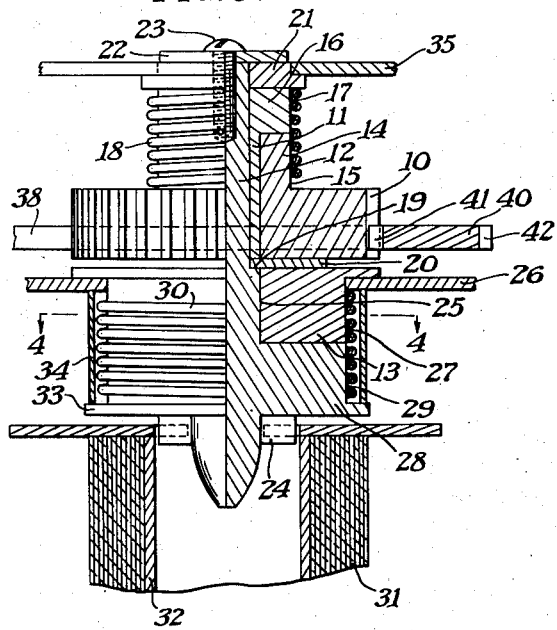
Fig. 3 is an elevational view, partly in section, of the unidirectional winding mechanism.

The winding mechanism embodying the present invention comprises a pinion 10, sleeve 11, a winding shaft 12, and a non-rotatable element 13, all of which are assembled coaxially. The pinion 10 has an integral coaxial projection 14 which provides a cylindrical clutch surface 15. The pinion 10 is journalled upon the sleeve 11, the latter having an integral projection 16 which provides a cylindrical clutch surface 17. The cylindrical clutch surfaces 15 and 17 are of like curvature and are positioned adjacent to each other to form, in effect, a continuous surface. A coil spring 18, having no positive connection to any of the elements of the winding mechanism, is wound about the two cylindrical surfaces 15 and 17, and is normally in slight frictional contact therewith. When the pinion 10 in Fig. 3 is rotated in one direction (clockwise as viewed from above), the portion of the spring wound about the projection 14 is rotated thereby which causes the coil spring to tighten upon the clutch surfaces 15 and 17, thus increasing the frictional engagement of the spring with these surfaces. The spring and cylindrical surfaces thus function as a clutch and the rotation of the pinion transmits a corresponding rotation to the sleeve 11. Upon reversing the direction of rotation of the pinion 10, the spring wound about the projection 14 is correspondingly rotated, causing the radius of the coil to increase, thereby decreasing the frictional engagement of the spring with the several cylindrical surfaces. The spring thus slips relative to these surfaces and the rotation of the pinion results in no corresponding rotation being transmitted to the sleeve 11. The spring and associated clutch surfaces 15 and 17 thus function as a unidirectional clutch.

Fixedly secured to the sleeve 11 is the winding shaft 12. The reduced end of shaft 12 provides a shoulder 19 upon which are assembled, as noted in Fig. 3, a washer 20, the sleeve 11 and a bearing ring 21. These are secured in non-rotatable relation on the shaft 12 by means of a retaining washer 22 and a screw 23 which threads into one end of the shaft. The combined thickness of the bearing ring 21 and the washer 20 plus the height of the sleeve 11, being slightly greater than the length of the reduced end of shaft 12, threading of the screw 23 into the winding shaft 12 will force the retaining washer 22 into tight frictional engagement with the bearing ring, thereby securing the bearing ring 21, the sleeve 11 and the washer 20 in non-rotatable engagement with each other and with the winding shaft 12. Although the sleeve 11 and bearing ring 21 are illustrated herein as separate elements, they may, of course, be integrally formed. The height of the pinion 10 and projection 14 is only slightly less than the distance between the sleeve projection 16 and the washer 20 to permit relative rotation between the pinion and the sleeve. The other end of the shaft 12 terminates in film spool engaging means 24.

Below the shoulder 19 the shaft 12 presents a bearing surface 25 which is journalled in the non-rotatable element 13. The non-rotatable element 13 is fixedly secured to a panel 26 in the body of the camera, the outer surface 27 of the element 13 constituting a cylindrical clutch surface. An enlarged portion 28 on the end of the shaft adjacent to the film spool engaging means 24 provides a fourth cylindrical clutch surface 29. Cylindrical surfaces 27 and 29 are of like curvature and are positioned adjacent to each other to form, in effect, a continuous surface. A coil spring 30 having no positive connection to any of the elements of the winding mechanism, is wound in a direction opposite to that of coil spring 18 about the two cylindrical surfaces 27 and 29. The spring 30 like spring 18 is normally in slight frictional contact with the corresponding clutch surfaces. As described above, rotation of the pinion 10 in a clockwise direction transmits a corresponding rotation to the sleeve 11 and to the winding shaft 12 to which the sleeve is fixed. But since the coil spring 30 is wound in a direction opposite to that of coil spring 18, the rotation of the sleeve and shaft by the pinion tends to increase the radius of coil 30 which precludes the transmission of a torque from the winding shaft to the non-rotatable element 13, thus permitting the shaft to rotate relative to element 13 and thereby wind the film 31 upon the take-up spool 32.

Rotation of the winding shaft 12 in an opposite or counterclockwise direction, however, is prevented by the spring 30 and associated clutch surfaces 27 and 29, since such rotation causes the spring to more firmly grip those surfaces as the radius of the coil tends to decrease. This arrangement thus prevents tension in the film from unwinding film from the take-up spool. Moreover, any small torque which might possibly be transmitted to the winding shaft through the sleeve 11 by a counterclockwise rotation of the pinion will not cause the film spool 32 to unwind the film since the winding shaft is secured against such rotation by the above-described operation of the spring 30 and associated clutch surfaces 27 and 29.

Since pinion 10 rotates relative to the fixed element 13, the washer 20 is provided to serve as spacing means between the two elements. Coil spring 18 is retained in position by the pinion 10 and the bearing ring 21 which provide shoulders confining the spring therebetween. Similarly, coil spring 30 is held against endwise displacement by the panel 26 and a shoulder 33 integrally formed on the enlarged portion 28 on winding shaft 12.

Figure 4:
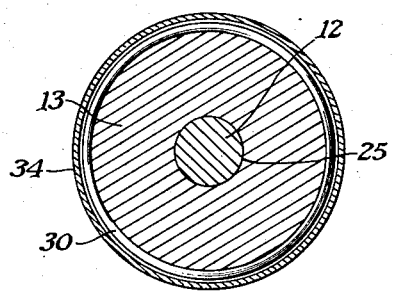
Fig. 4 is a section taken on the line 4—4 of Fig. 3.

To prevent backlash of the winding shaft after a section of film has been found upon the take-up spool, a sleeve 34 is provided which fits loosely about the coil spring 30, as may be noted in Figs. 3 and 4. When the winding shaft is rotated in a clockwise direction, which tends to expand the coil, that is, increase its diameter, the sleeve 34 prevents non-uniform expansion of the coil convolutions which would result in the coil 30 acting as a torsion spring. This condition would in turn result in the spring 30 rotating the winding shaft a small amount in a counterclockwise direction upon release of the hand lever 38, as the spring 30 assumed its normal position about the cylindrical surfaces 27 and 29. The sleeve 34, however, functions to prevent any coil convolutions from expanding more than the others with the result that the coil functions only in its clutch capacity and not as a torsion spring. A similar sleeve may be provided, if desired, about the coil spring 18. While each of the springs is described above as having no positive connection with any of the elements of the winding mechanism, it is apparent that one end of either or each coil may be secured to one of the elements about which it is wound, although this is not necessary.

A plate 35 is fastened to and spaced from the panel 26 by the stud 36 and the bolt 37. The plate provides a bearing for the bearing ring 21 on the end of the winding shaft and serves to support the winding mechanism within the camera body. The plate and supporting stud and bolt have other purposes which will later become apparent.

Figure 1:
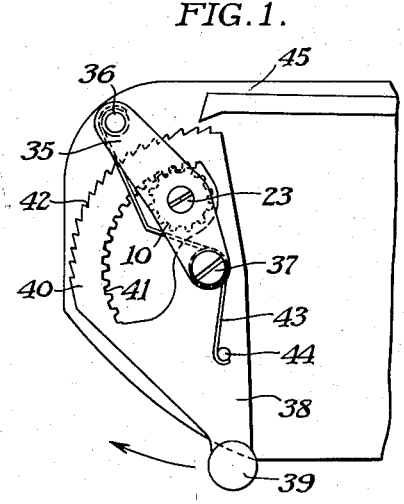
Fig. 1 is a plan view of the film-wind device showing the hand-operated, winding lever in retracted position.
Figure 2:
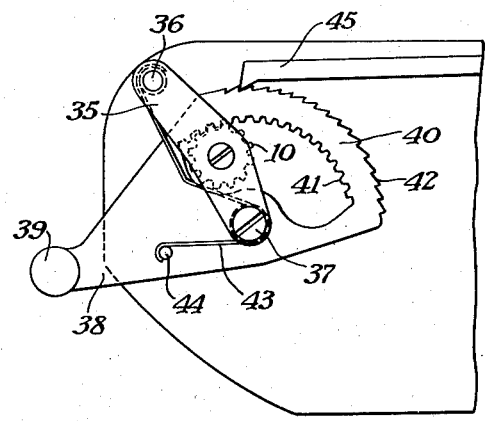
Fig. 2 is a similar plan view showing the ratchet sector of the winding lever engaged by the film-metering pawl, arresting further winding of the take-up spool.

Rotation of the pinion 10 is effected by means of the hand-operated lever 38 which is journalled upon the bolt 37. One end of the lever is provided with the hand knob 39, the other end with a composite gear and ratchet sector 40. This sector, as noted in Fig. 1, has gear teeth 41 on one edge thereof and ratchet teeth 42 on the other. The gear teeth 41 engaging the pinion 10 cause it to rotate when the lever 38 is rotated. Clockwise rotation of the lever as indicated by the arrow in Fig. 1 produces a like rotation of the pinion which is transmitted by the clutch spring 18 to the winding shaft 12, as above described, which causes the film to be wound upon the take-up spool 32. When the gear sector reaches the end of its travel, as shown in Fig. 2, the lever is released and automatically returned to its initial position by the compressed spring 43. The latter is wound centrally about the bolt 37, one end of the spring bearing upon the stud 36 and the other bearing upon a pin 44 secured to the lever 38. The return of the lever rotates the pinion in a counterclockwise direction but, as described above, such rotation transmits no torque to the sleeve 11 since the counterclockwise rotation of the pinion tends to open up the coil spring 18 with the result that the clutch spring slips upon the cylindrical clutch surfaces. Moreover, counterclockwise rotation of the winding shaft 12 is prevented by the coil spring 30 tightening upon the clutch surfaces 27 and 29, thus precluding relative rotation between the shaft and the fixed element 13.

The ratchet teeth 42 are adapted to be engaged by the pawl 45 when the required length of film has been metered out. This precludes further winding of the film upon the spool 32 and yet permits the lever 38 to return to its initial position when released, the pawl riding over the ratchet teeth. Fig. 1 shows the ratchet not yet engaged by the pawl while Fig. 2 illustrates the pawl in engagement with the ratchet. The pawl may be actuated by any known film metering mechanism such as, for example, that described in the patent to Nagel cited above. It is apparent, too, that the ratchet teeth may be provided on some element of the winding mechanism other than the lever, as, for example, on the winding shaft or pinion. The winding device, described herein, however, may be employed independent of any film metering means and the ratchet teeth 42 omitted. In such an application the film may be wound until some marking upon the film or paper backing is observed through an observation window in the camera. And, as indicated above, the winding mechanism described herein will have application in devices other than cameras, wherever an efficient, rapid, hand-winding mechanism is desired.

From the foregoing description, it will be apparent that I have provided means for obtaining all the objects and advantages of this invention.

What I claim and desire to secure by Letters Patent of the United States is:

1. A film winding device for a roll film camera comprising a winding shaft member having a boss adjacent each end of the shaft, each boss having a cylindrical clutch surface, means adapted to impart unidirectional rotation to said winding shaft member rotatably mounted on said member and including a projection having a cylindrical clutch surface positioned adjacent to and of curvature similar to the cylindrical surface on one of said bosses, a continuous coil spring wound about said adjacent cylindrical surfaces, means adapted to be non-rotatably secured to the camera, said winding shaft member being journalled in said latter means, said latter means having a cylindrical clutch surface positioned adjacent to and of curvature similar to the cylindrical surface on the other of said bosses, a second continuous coil spring wound about the latter cylindrical surfaces to permit unidirectional rotation of the winding shaft member relative to said latter means, said coil springs being wound in opposite directions.

2. A film winding device for a roll film camera comprising a winding shaft member having film spool engaging means at one end and having a boss adjacent each end of the shaft, each boss having a cylindrical clutch surface, toothed means adapted to impart unidirectional rotation to said winding shaft member rotatably mounted on said member and including a projection having a cylindrical clutch surface positioned adjacent to and of curvature similar to the cylindrical surface on one of said bosses, a continuous coil spring wound about said adjacent cylindrical surfaces, means adapted to be non-rotatably secured to the camera, said winding shaft member being journalled in said latter means, said latter means having a cylindrical clutch surface positioned adjacent to and of curvature similar to the cylindrical surface on the other of said bosses, a second continuous coil spring wound about the latter cylindrical surfaces to permit unidirectional rotation of the winding shaft member relative to said latter means, said coil springs being wound in opposite directions, and a toothed winding element in engagement with said toothed means adapted to be pivotally connected to the camera.

3. A film winding device for a roll film camera comprising a winding shaft member having film spool engaging means at one end and having a boss adjacent each end of the shaft, each boss having a cylindrical clutch surface, a pinion adapted to impart unidirectional rotation to said winding shaft member rotatably mounted on said member and including a projection having a cylindrical clutch surface positioned adjacent to and of curvature similar to the cylindrical surface on one of said bosses, a continuous coil spring wound about said adjacent cylindrical surfaces, means adapted to be non-rotatably secured to the camera, said winding shaft member being journalled in said latter means, said latter means having a cylindrical clutch surface positioned adjacent to and of curvature similar to the cylindrical surface on the other of said bosses, a second continuous coil spring wound about the latter cylindrical surfaces to permit unidirectional rotation of the winding shaft member relative to said latter means, said coil springs being wound in opposite directions, and a spring-biased winding element adapted to be pivotally connected to the camera and having a gear sector which engages said pinion.

4. A film winding device for a roll film camera comprising a winding shaft member having film spool engaging means at one end and having a boss adjacent each end of the shaft, each boss having a cylindrical clutch surface, a pinion adapted to impart unidirectional rotation to said winding shaft rotatably mounted on said member and including a projection having a cylindrical clutch surface positioned adjacent to and of curvature similar to the cylindrical surface on one of said bosses, a continuous coil spring wound about said adjacent cylindrical surfaces, means adapted to be non-rotatably secured to the camera, said winding shaft member being journalled in said latter means, said latter means having a cylindrical clutch surface positioned adjacent to and of curvature similar to the cylindrical surface on the other of said bosses, a spacer washer on the winding shaft positioned between said pinion and said latter means, a second continuous coil spring wound about the latter cylindrical surfaces to permit unidirectional rotation of the winding shaft member relative to said latter means, said coil springs being wound in opposite directions, a sleeve fitting loosely and in close proximity about at least one of said coil springs, and a spring-biased winding element adapted to be pivotally connected to the camera and having a gear sector which engages said pinion.

5. In a roll film camera including a pawl actuated by a film metering device, a film winding device comprising a winding shaft member having film spool engaging means at one end and having a boss adjacent each end of the shaft, each boss having a cylindrical clutch surface, toothed means adapted to impart unidirectional rotation to said winding shaft member rotatably mounted on said member and including a projection having a cylindrical clutch surface positioned adjacent to and of curvature similar to the cylindrical surface on one of said bosses, a continuous coil spring wound about said adjacent cylindrical surfaces, means adapted to be non-rotatably secured to the camera, said winding shaft member being journalled in said latter means, said latter means having a cylindrical surface positioned adjacent to and of curvature similar to the cylindrical surface on the other of said bosses, a second continuous coil spring wound about the latter cylindrical surfaces to permit unidirectional rotation of the winding shaft member relative to said latter means, said coil springs being wound in opposite directions, and a toothed winding element having a ratchet thereon adapted to be pivotally connected to the camera, said toothed winding element being in engagement with said toothed means, the ratchet being adapted to be engaged by the pawl actuated by the film metering device.

6. In a roll film camera including a pawl actuated by a film metering device, a film winding device comprising a winding shaft member having film spool engaging means at one end and having a boss adjacent each end of the shaft, each boss having a cylindrical clutch surface, a pinion adapted to impart unidirectional rotation to said winding shaft member rotatably mounted on said member and including a projection having a cylindrical clutch surface positioned adjacent to and of curvature similar to the cylindrical surface on one of said bosses, a continuous coil spring wound about said adjacent cylindrical surfaces, means adapted to be non-rotatably secured to the camera, said winding shaft member being journalled in said latter means, said latter means having a cylindrical surface positioned adjacent to and of curvature similar to the cylindrical surface on the other of said bosses, a second continuous coil spring wound about the latter cylindrical surfaces to permit unidirectional rotation of the winding shaft member relative to said latter means, said coil springs being wound in opposite directions, a sleeve fitting loosely and in close proximity about at least one of said coil springs, and a spring-biased winding element adapted to be pivotally connected to the camera and having a gear sector and a ratchet sector thereon, the gear sector engaging said pinion and the ratchet sector being adapted to be engaged by the pawl actuated by the film metering device.

7. In a roll film camera, the combination with a film metering device adapted to be secured to the camera and a pawl actuated by the film metering device, of a non-rotatable element adapted to be secured to the camera, said element having a cylindrical clutch surface, a winding shaft member journalled in said element and having film spool engaging means at one end and having a boss adjacent each end of the shaft, each boss having a cylindrical clutch surface, one of which surfaces is positioned adjacent to and of curvature similar to the cylindrical surface on the non-rotatable element, a continuous coil spring wound about said adjacent cylindrical surfaces to permit unidirectional rotation of the winding shaft member relative to the non-rotatable element, toothed means rotatably mounted on said shaft member and including a projection having a cylindrical clutch surface positioned adjacent to and of curvature similar to the other of said cylindrical surfaces on said bosses, a second continuous coil spring wound about the latter cylindrical surfaces whereby rotation of said toothed means may impart unidirectional rotation to said winding shaft member, said coil springs being wound in opposite directions, and a toothed winding element having a ratchet thereon adapted to be a pivotally connected to the camera, said toothed winding element meshing with said toothed means and the ratchet being engageable by the pawl actuated by the film metering device.

8. In a roll film camera, the combination with a film metering device adapted to be secured to the camera and a pawl actuated by the film metering device, of a non-rotatable element adapted to be secured to the camera, said element having a cylindrical clutch surface, a winding shaft member journalled in said element and having film spool engaging means at one end and having a boss adjacent each end of the shaft, each boss having a cylindrical clutch surface, one of which surfaces is positioned adjacent to and of curvature similar to the cylindrical surface on the non-rotatable element, a continuous coil spring wound about said adjacent cylindrical surfaces to permit unidirectional rotation of the winding shaft member relative to the non-rotatable element, a pinion rotatably mounted on said shaft member and including a projection having a cylindrical clutch surface positioned adjacent to and of curvature similar to the other of said cylindrical surfaces on said bosses, a second continuous coil spring wound about the latter cylindrical surfaces whereby rotation of said pinion may impart unidirectional rotation to said winding shaft member, said coil springs being wound in opposite directions, a sleeve fitting loosely and in close proximity about at least one of said springs, and a spring-biased winding element adapted to be pivotally connected to the camera and having a gear sector and a ratchet sector thereon, the gear sector meshing with said pinion and the ratchet being engageable by the pawl actuated by the film metering device.

DOUGLASS C. HARVEY.

REFERENCES CITED

The following references are of record in the file of this patent:

UNITED STATES PATENTS

| Number | Name | Date |
|---|---|---|
| 1,203,528 | Gardner | Oct. 31, 1916 |
| 2,004,650 | Collyear et al. | June 11, 1935 |
| 2,098,021 | Wheeler | Nov. 2, 1937 |
| 2,161,941 | Zapp | June 13, 1939 |

FOREIGN PATENTS

| Number | Country | Date |
|---|---|---|
| 386,358 | Great Britain | Jan. 19, 1933 |